United States Patent [19]
Suzuki et al.

[11] Patent Number: 6,038,087
[45] Date of Patent: Mar. 14, 2000

[54] SEALING DEVICE AND SEALING DEVICE OF CAMERA

[75] Inventors: Tatsuya Suzuki, Tokyo; Tamotsu Koiwai, Akiruno, both of Japan

[73] Assignee: Olympus Optical Co., Ltd., Japan

[21] Appl. No.: 09/174,180

[22] Filed: Oct. 16, 1998

[30] Foreign Application Priority Data

Oct. 17, 1997 [JP] Japan .................. H9-285619

[51] Int. Cl.$^7$ .................. G02B 7/02; G03B 17/08
[52] U.S. Cl. .................. 359/819; 396/25
[58] Field of Search .................. 359/819; 396/25, 396/26, 27, 28, 29

[56] References Cited

U.S. PATENT DOCUMENTS

| | | | |
|---|---|---|---|
| 5,066,965 | 11/1991 | Tanaka | 354/64 |
| 5,713,048 | 1/1998 | Hayakawa | 396/25 |
| 5,819,118 | 10/1998 | Kawazaki | 396/29 |

FOREIGN PATENT DOCUMENTS 5-61711  8/1993  Japan .
9-138334  5/1997  Japan .

*Primary Examiner*—Georgia Epps
*Assistant Examiner*—Saeed Seyrafi
*Attorney, Agent, or Firm*—Ostrolenk, Faber, Gerb & Soffen, LLP

[57] ABSTRACT

A sealing device has a sealing assembly disposed between a pair of a fixed frame and a first moving frame that relatively circularly move and rectilinearly move. The sealing assembly is fixed by bonding to the fixed frame. Two inclined fins of the sealing assembly are in slidable contact with the outer peripheral surface of the first moving frame. The fins provide a reliable light shielding, waterproofing, drip-proofing, or dust-proofing effect between the fixed frame and the first moving frame. The gap between the first moving frame and a second moving frame and the gap between the second moving frame and a frame are also sealed by the sealing assembly in the same manner. The sealing device permits reliable light shielding, waterproofing, drip-proofing, or dust-proofing, and also enables a lens frame to be made smaller at the same time.

18 Claims, 4 Drawing Sheets

SEALING DEVICE AND SEALING DEVICE OF CAMERA

BACKGROUND OF THE INVENTION

1. Field of the Invention

The present invention relates to a sealing device or a sealing device of a camera which provides a dust-proof, waterproof, drip-proof, or light-shielding function at a gap between paired moving members or paired moving member and fixed member (moving/fixed members) that relatively move, or a gap at a sliding section of a camera lens frame.

2. Description of the Related Art

The light-shielding device of a camera proposed in Japanese Unexamined Utility Model Publication No. 5-61711 as a sealing device for a conventional camera or the like employs an annular seat made of a low-friction, opaque resin, and flocked cloth. The annular seat has an inside diameter that is smaller than the outside diameter of a movable barrel; it is bonded to an annular base plate that is larger than the external dimension of the movable barrel, the base plate being fitted to the front cover of the camera. The inner diameter portion of the annular seat is flexibly fitted along the profile of the movable barrel to provide light-shielding and dust-proof effect in cooperation with the flocked cloth.

However, in the light-shielding device of a camera disclosed in the aforesaid Japanese Unexamined Utility Model Publication No. 5-61711, the seat in slidable contact with the movable barrel is composed of a single layer, so that dust or the like easily enters therein, resulting in poor safety. In addition, the need of the flocked cloth adds to the total cost.

A lens frame assembly disclosed in Japanese Unexamined Patent Publication No. 9-138334 employs an annular elastic light-shielding member made of a rubber material or the like to provide light shielding and waterproof functions between a rotary frame and a moving frame. The light-shielding member has a securing section on one end thereof secured to the rotary frame and it also has a slidable double-lip projection on the side of the moving frame. Formed between the securing section and the projection is a hill-shaped bent section to enable the projection to be in good slidable contact with the outer surface of the moving frame.

However, the light-shielding member applied to the lens frame assembly disclosed in the foregoing Japanese Unexamined Patent Publication No. 9-138334 has the following disadvantage. The double-lip portion of the projection is not of a complete two-piece structure, making it difficult for the two lips to work independently, preventing light shielding and dustproof effects effect from being fully implemented.

SUMMARY OF THE INVENTION

Accordingly, the present invention has been made with a view toward solving the problems described above, and it is an object thereof to provide a sealing device or a sealing device of a camera that is capable of providing a reliable light shielding, waterproofing, drip-proofing, or dust-proofing effect, and also permits a moving frame, a lens frame, etc. to be made smaller.

According to one aspect of the present invention, there is provided a sealing device equipped with a pair of moving members or a pair of moving/fixed members. The members pairs are composed of a combination of a moving member and a fixed member that perform relative movement including at least rectilinear movement. In addition, a sealing assembly that has a securing portion fixed to an inner or outer surface of one moving member or the fixed member of the paired moving members or the paired moving/fixed members, and a plurality of fins extends from the securing portion to the other moving member or the fixed member to fill a gap produced between the paired moving members or moving/fixed members to provide at least a light-shielding, waterproofing, drip-proofing, or dust-proofing effect. The plurality of fins of the sealing assembly are made integral with the securing portion. The fins are shaped so that they gradually grow thinner from the securing portion toward distal ends of the fins and are all inclined in one of the directions of rectilinear relative movement of the moving members.

According to another aspect of the present invention, there is provided a sealing device of a camera. The sealing device is equipped with a pair of frames that perform relative movement including at least rectilinear movement. In addition, a sealing assembly has a securing portion fixed to one frame of the paired frames, and a plurality of fins extends from the securing portion to the other frame to fill a gap produced between the paired frames to provide at least a light-shielding, waterproofing, drip-proofing, or dust-proofing effect. The plurality of fins of the sealing assembly are made integral with the securing portion. The fins are shaped so that they gradually grow thinner from the securing portion toward distal ends of the fins and are all inclined in one of the directions of rectilinear relative movement of the frame.

According to yet another aspect of the present invention, there is provided another sealing device of a camera. The sealing device is equipped with a pair of frames that perform relative movement including at least rectilinear movement. In addition a sealing assembly has an annular securing portion fixed to an inner or outer surface of one frame of the paired frames. A plurality of fins extends from the securing portion to the other frame to fill a gap produced between the paired frames to provide at least a light-shielding, waterproofing, drip-proofing, or dust-proofing effect. The plurality of fins of the sealing assembly is made integral with the securing portion. The fins are shaped so that they gradually grow thinner from the securing portion toward distal ends of the fins and are all inclined in one of the directions of rectilinear relative movement of the frames.

DESCRIPTION OF THE PREFERRED EMBODIMENT

An embodiment of the present invention will now be described in conjunction with the accompanying drawings.

Figure 1:
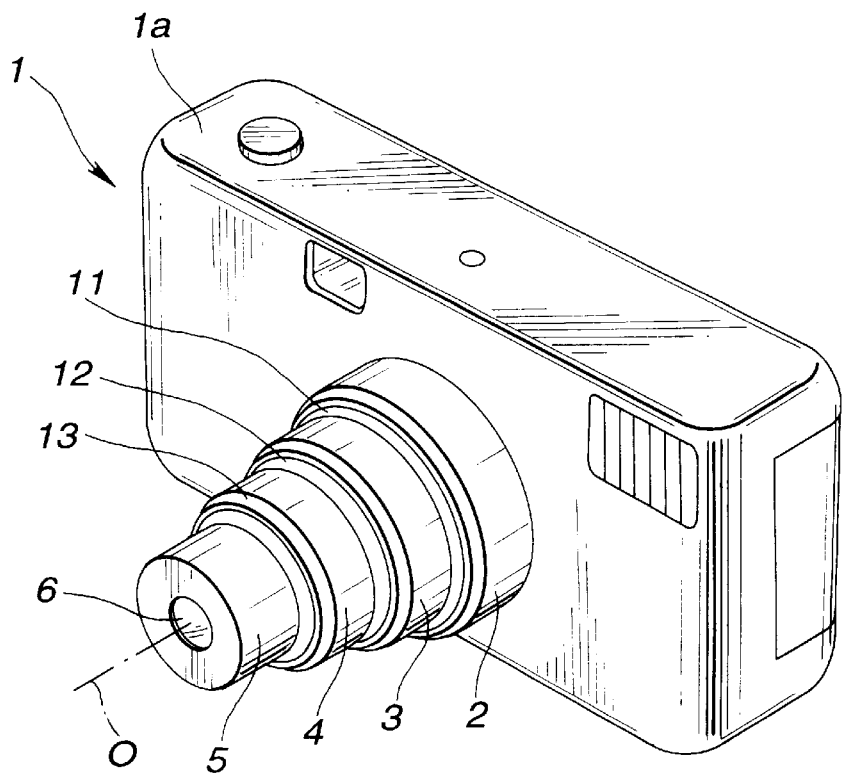
FIG. 1 is a perspective view of a camera incorporating a sealing device of a frame assembly that is an embodiment in accordance with the present invention, the frame assembly having been extended.
Figure 2:
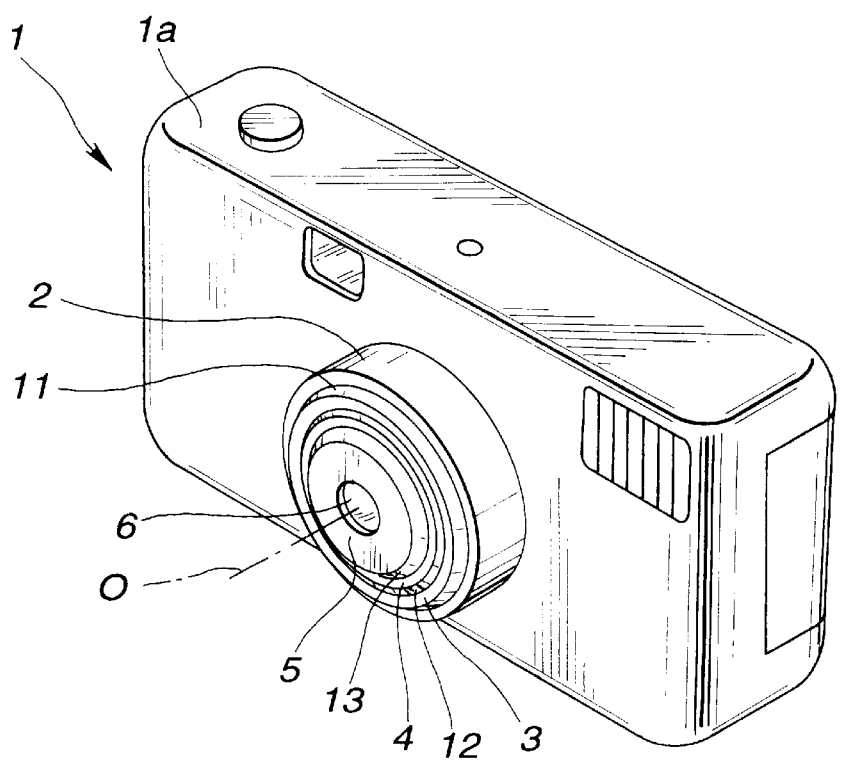
FIG. 2 is a perspective view-of the camera shown in FIG. 1, wherein the frame assembly has been retracted.

FIGS. 1 and 2 are perspective views illustrative of the appearance of a camera to which a sealing device of a lens frame assembly, which is an embodiment of the present invention, has been applied. FIG. 1 shows the lens frame assembly in an extended state, while FIG. 2 shows the lens frame assembly in a retracted state.

The lens frame assembly which is a moving frame assembly or a moving barrel assembly and which has been incorporated in a camera 1 is constituted by: a fixed frame or fixed barrel 2 which is a fixed member supported by being fixed to a camera main body 1a; a first moving frame 3 that circularly moves and rectilinearly moves with respect to the fixed frame 2; a second moving frame 4 that circularly moves and rectilinearly moves with respect to the first moving frame 3; and a lens frame 5 that circularly moves and rectilinearly moves with respect to the second moving frame 4 and rectilinearly moves with respect to the camera main body 1a. The fixed frame 2 is an exterior member of the camera main body; it may be composed of a cover or the like.

A sealing assembly 11 is provided between the fixed frame 2 and the first moving frame 3, a sealing assembly 12 is provided between the first moving frame 3 and the second moving frame 4, and a sealing assembly 13 is provided between the second moving frame 4 and the lens frame 5. These frames with the sealing members provided therebetween, respectively, are paired.

The sealing members 11, 12, and 13 are elastic, flexible annular members made of silicone rubber or the like to light-shield and waterproof, or drip-proof and dust-proof the gap between the respective paired lens frames. One end of each of the sealing members is retained by being bonded to one of each paired frames, and the sealing member slides with a fin portion thereof held in contact with the outer peripheral surface of the other lens frame of the pair to provide a sealed condition.

Figure 3:
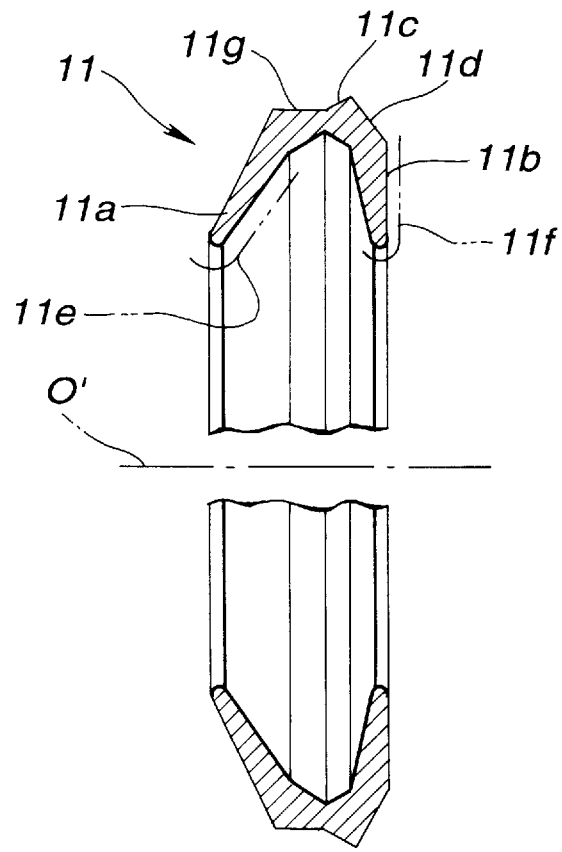
FIG. 3 is a sectional view of a sealing assembly applied to the sealing device of the camera shown in FIG. 1.

FIG. 3 is a longitudinal sectional view illustrating the configuration of the axial section of the sealing assembly 11. The sealing members 12 and 13 share the same configurations as the sealing assembly 11; therefore, the following description of the configuration and others will refer only to the sealing assembly 11.

As shown in FIG. 3, the sealing assembly 11 is provided with two lip-shaped fins 11a and 11b extending inward, an annular outer periphery 11g parallel to an axial center O' at which the sealing assembly 11 is fixed, an outer peripheral projection 11c inclined outward with respect to the outer periphery, and a slant side surface 11d located on the rear side of the outer peripheral projection 11c.

The fin 11a is inclined to the front side in the inner circumferential direction and has a tapered fin shape. The other fin 11b is nearly perpendicular in the inner circumferential direction and also has a tapered fin shape. Rear side surfaces 11e and 11f providing the sliding surfaces of the fins 11a and 11b are provided with lubricant coating. The fin 11a is inclined to the front side and the other fin 11b is perpendicular to the axial center O' as mentioned above to permit easy rapping when molding them. The term "the front side" means the side facing a subject when the fin assembly is secured to a frame, while the term "the rear side" means the side facing a film surface when the fin assembly is secured to the frame.

Figure 4:
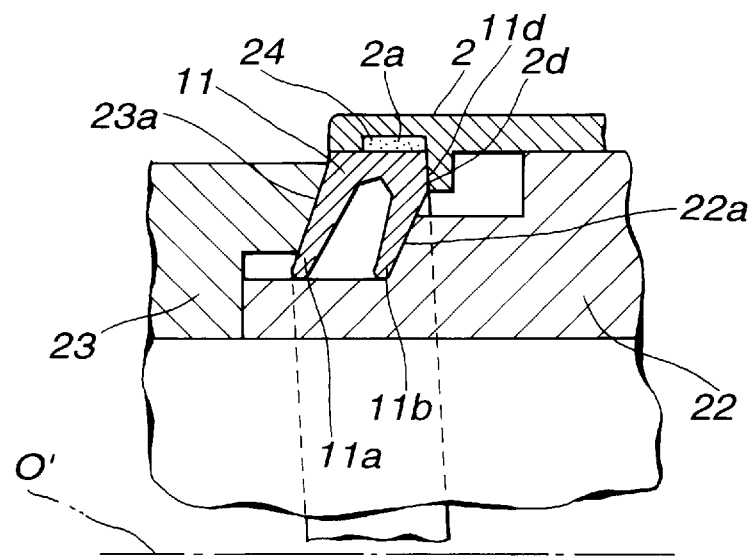
FIG. 4 is a sectional view showing a state wherein the sealing assembly shown in FIG. 3 is secured to the frame assembly by bonding jigs.

The sealing assembly 11 is bonded to the fixed frame 2 by using bonding jigs 22 and 23. FIG. 4 is a sectional view illustrating the sealing assembly 11 being assembled using the bonding jigs.

First, the sealing assembly 11 is fitted to the sealing assembly bonding portion at the tip of the fixed frame 2. As shown in FIG. 4, the sealing assembly 11 is clamped between the bonding jigs 22 and 23. The fin 11a of the sealing assembly is pressed by a pressing slant surface 23a of the jig to bring the slant side surface 11d of the sealing assembly into contact with a receiving surface 2d of the fixed frame 2. This causes the slant side surface 11d to deform so as to be perpendicular to the axial center O', and the fins 11a and 11b are both inclined in parallel toward the subject side of the fixed frame 2 and retained in this condition in a conical shape.

With the jigs set as described above, an adhesive agent 24 is injected into an adhesive agent reservoir 2a to bond the sealing assembly. The slant side surface 11d of the sealing assembly is pressed and deformed as set forth above, so that the outer peripheral projection 11c is substantially aligned with the outer peripheral surface 11g parallel to the axial center O' of the sealing assembly 11. This enables secure bonding to be achieved.

The remaining sealing assemblies 12 and 13 are also secured by being bonded to the first moving frame 3 and the second moving frame 4, respectively. After bonding process is finished, fins 12a and 12b of the sealing assembly 12, and fins 13a and 13b of the sealing assembly 13 will be also retained in such a manner that they are inclined in parallel toward the subject side of the first moving frame 3 and the second moving frame 4, respectively.

Figure 5:
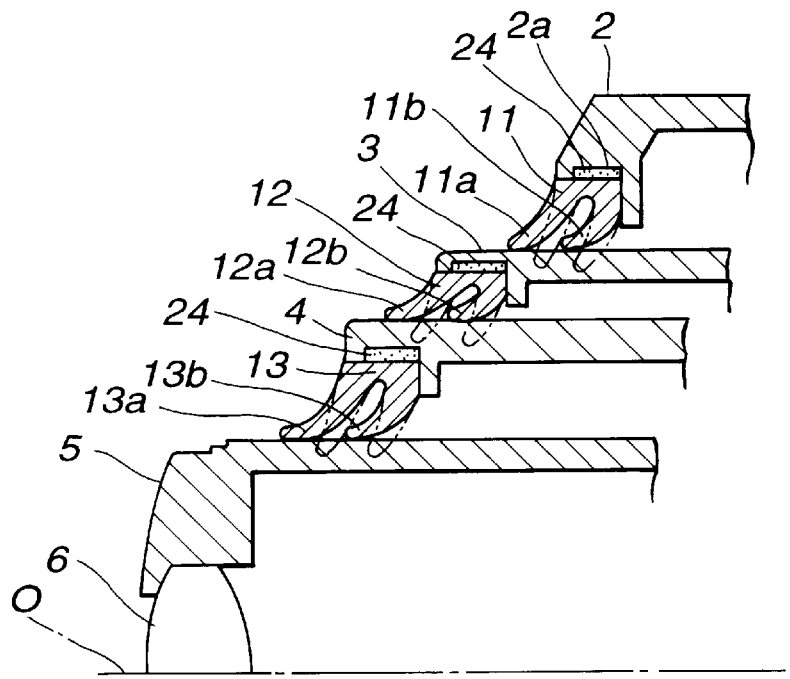
FIG. 5 is a longitudinal sectional view showing the neighborhood of the sealing section of the frame assembly of the camera shown in FIG. 1, the frame assembly being in the extended state.
Figure 6:
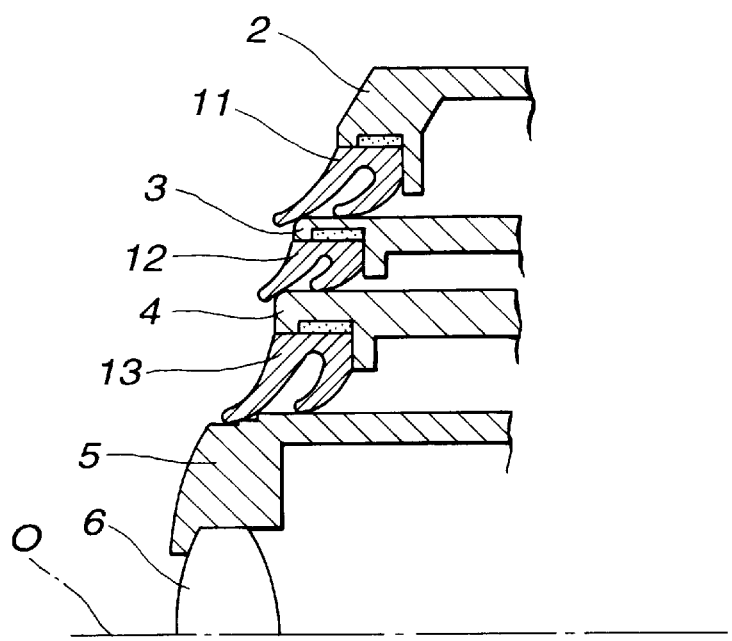
FIG. 6 is a longitudinal sectional view showing the neighborhood of the sealing section of the frame assembly of the camera shown in FIG. 1, the frame assembly being in the retracted state.

The fixed frame 2, the moving frames 3 and 4, and the lens frame 5 to which the sealing assemblies 11, 12, and 13 have been fixed are installed to the camera main body. FIG. 5 is a sectional view of the frame assembly after all the frames have been installed, all the frames being in the extended state. FIG. 6 is a sectional view of the frame assembly, wherein all the frames have been retracted. In FIG. 5, the fins of the sealing assemblies 11, 12, and 13 indicated by two-dot chain lines illustrate the state thereof before the frames, which relatively move, are inserted and the fins are inclined in parallel toward the front. Under this condition, when the frames, which relatively move, are inserted, the fins of the respective sealing assemblies 11, 12, and 13 are pressed by the outer peripheries of the frames, which relatively move, and inclined further toward the front. This causes the side surfaces 11e and 11f, which are provided with the lubricant coating, to come in contact with the outer peripheral surface of the frame.

Thus, according to the sealing device of the frame assembly of the embodiment set forth above, as shown in FIGS. 5 and 6, the fins of the sealing assemblies are in slidable contact with the outer peripheral surfaces of the frames, which relatively rotate and rectilinearly move. At this time, the tapered fins are inclined in the same direction when they come in slidable contact with the outer peripheral surfaces. Hence, the inclined fins come in close slidable contact with the outer peripheral surfaces, thus effectively preventing light rays, water droplets, dust, etc. from entering through the gap between paired frames. Moreover, since the fin assembly has two fins, even if water droplets, dust, etc. manage to pass through the first fin, the second fin blocks them to securely prevent their entry. The sealing assembly itself is shaped not to require a large space, so that it does not add to the size of the finished frame assembly incorporating the sealing assembly.

As a molding before installation to the frames, the sealing assembly has one fin thereof inclined toward the front, while the other fin thereof extends perpendicularly to the axial center. Both fins have no undercut; therefore, the sealing member can be smoothly released from a mold without a danger of damaging the fins.

If a plurality of fins of the sealing assembly as the molding were inclined in the same direction, the mold used for the sealing assembly would be complicated from the viewpoint of rapping when they have undercuts. This is disadvantageous in that the sealing assemblies may be damaged when releasing them from molds or the productivity may be decreased.

In the example of the sealing device according to the foregoing embodiment, the sealing assembly is secured to the outer frame of the paired frames; the present invention, however, is not limited thereto. The same advantage can be obtained even if the sealing assembly is secured to the inner frame and the fins are in slidable contact with the inner surface of the outer frame.

Figure 7:
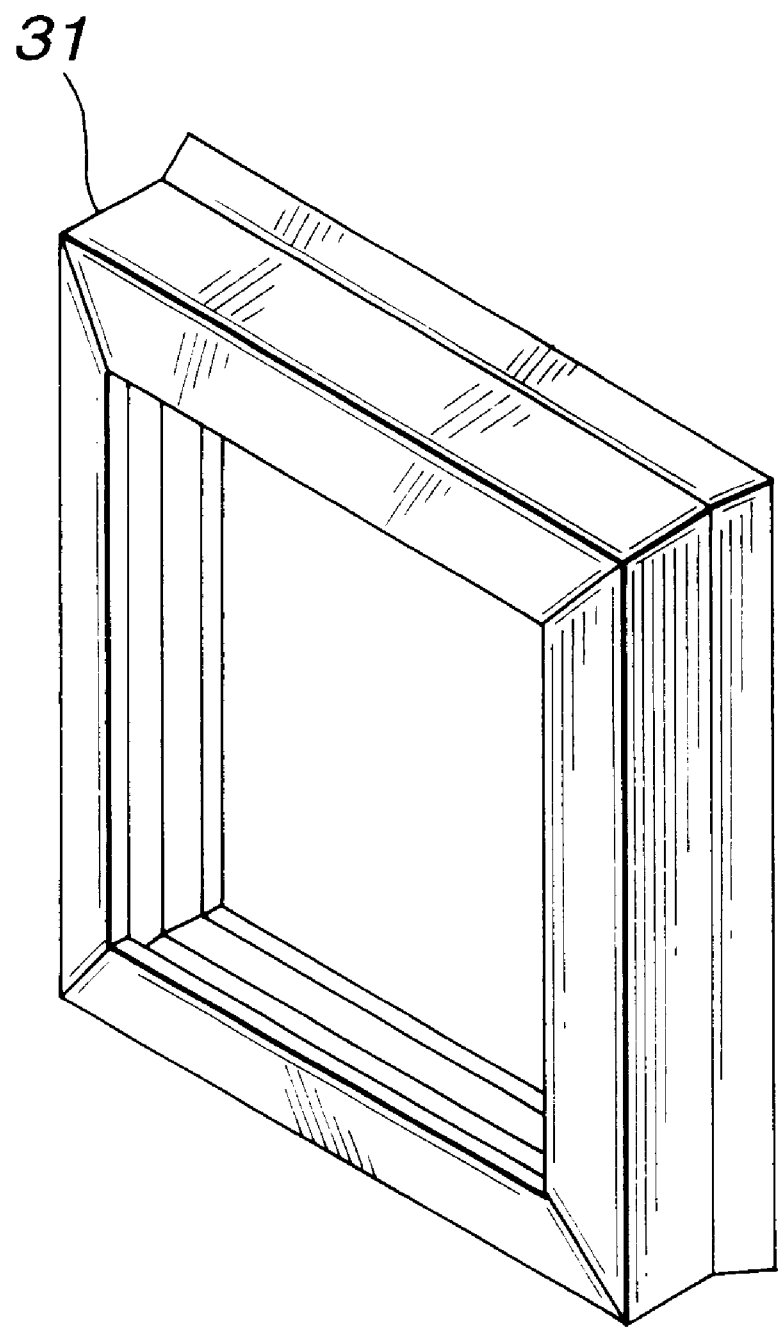
FIG. 7 is a perspective view of a modification example of the sealing assembly applied to the frame assembly of the camera shown in FIG. 1.

The sealing assemblies in the sealing device according to the foregoing embodiment are annular. The sealing assemblies, however, are not limited to the annular shape; they may have a shape matched to the configurations of the frames to be sealed. A sealing assembly 31 shown in FIG. 7 has the shape applied when a lens frame to be used is square. The shape of the section of the sealing assembly 31 is to be identical to that of the sealing assembly shown in FIG. 3.

The sealing device according to the foregoing embodiment has been applied to the frame assembly of a camera or the like; however, the sealing device in accordance with the present invention is not limited thereto. Obviously, the sealing device in accordance with the present invention can be also applied to provide light shielding and waterproofing or drip-proofing and dust-proofing between moving members that perform relative rectilinear movement or relative rectilinear movement including rotation.

As set forth above, the sealing device or the sealing device of a camera in accordance with the present invention has sealing assemblies, each of which having a plurality of fins, and each fin is tapered toward its distal end from its fixed portion. The fins of the sealing device are inclined in one of the directions of the relative movement of a moving member or a frame before the moving member or the frame is inserted. Hence, the fins come in close slidable contact with the moving member or the frame. In addition, the fin assembly is composed of a plurality of fins to permit reliable light shielding, waterproofing, drip-proofing, or dust-proofing.

Although the present invention has been described in relation to particular embodiments thereof, many other variations and modifications and other uses will become apparent to those skilled in the art. Therefore, the present invention is to be limited not by the specific disclosure herein, but only by the appended claims.

What is claimed is:

1. A sealing device of a camera, comprising:
    a pair of lens frames that perform relative movement including at least rectilinear and circular movement; and
    a sealing assembly that has an annular securing portion fixed to one lens frame of said paired lens frames, and a plurality of fins that extend from said securing portion to the other lens frame to fill a gap produced between said paired lens frames to provide at least a light-shielding, waterproofing, drip-proofing, or dust-proofing effect;
    wherein the plurality of fins of said sealing assembly are made integral with said securing portion and each fin is shaped so that the fin gradually grows thinner from said securing portion toward a distal end of the fin, and the fins are all inclined in one of the directions of rectilinear relative movement of the lens frame.

2. A sealing device of a camera, comprising:
    a pair of lens frames that perform relative movement including a pair of a lens frame and a fixed member in which said lens frame moves with respect to the fixed member; and
    a sealing assembly that has an annular securing portion fixed to an inner or outer surface of one lens frame or the fixed member of said paired lens frames or said paired fixed member and lens frame, and a plurality of annular fins that extend from said securing portion to the other lens frame or the fixed member to fill a gap produced between said paired lens frames or said paired lens frame and fixed member to provide at least a light-shielding, waterproofing, drip-proofing, or dust-proofing effect;
    wherein the plurality of fins of said sealing assembly are made integral with said securing portion and are annular fins each having a conical shape.

3. A sealing device of a camera according to claim 2, wherein said sealing assembly is composed of an elastic, flexible rubber material.

4. A sealing device of a camera according to claim 3, wherein one of said plurality of fins has an annular shape that extends from said securing portion parallel to a plane that is perpendicular with respect to an axial center of said annular securing portion before said sealing assembly is fixed to said one lens frame or fixed member.

5. A sealing device according to claim 2, wherein said first member and said second member are lens frames.

6. A sealing device according to claim 2, wherein each of the fins constituting said sealing assembly are tapered from said base.

7. A sealing device according to claim 2, wherein a recessed portion where the base of said sealing assembly is fixed by bonding is formed in the inner peripheral surface of said first member or the outer peripheral surface of said second member.

8. A sealing device according to claim 2, wherein a flange for fixing the base of said sealing assembly is formed on the inner peripheral surface of said first member or the outer peripheral surface of said second member, and a recessed portion where said base is fixed by bonding is formed in said flange in contact with said base.

9. A sealing device according to claim 2, wherein the inner peripheral surface of said first member and the outer peripheral surface of said second member are cylindrical surfaces.

10. A sealing device according to claim 2, wherein the inner peripheral surface of said first member and the outer peripheral surface of said second member are plane surfaces.

11. A sealing device of a camera for sealing a gap between an inner peripheral surface of a first lens frame and an outer peripheral surface of a second lens frame, said first lens frame and said second lens frame being relatively movable, said sealing device comprising:
    a flange formed one end of the inner peripheral surface of said first lens frame; and
    a sealing assembly that has a plurality of fins extending from a base, and at least the fins formed on both ends of said base form a predetermined angle and said base has a concavely curved outer peripheral surface on the opposite side from said extending fins under a condition where said fins are subjected to no influence of an external force;

wherein the outer peripheral surface of said base lies along the inner peripheral surface of said flange and the said fins are arranged so that they are oriented in the same direction on the outer peripheral surface of said second frame when said sealing assembly is attached to said flange.

12. A sealing device of a camera according to claim 11, wherein each of the fins constituting said sealing assembly are tapered from said base.

13. A sealing device of a camera according to claim 11, where distal ends of said fins are oriented toward a subject side of said camera.

14. A sealing device of a camera according to claim 11, wherein a recessed portion of said flange, where the base of said sealing assembly is fixed by bonding, is formed in the inner peripheral surface of said flange.

15. A sealing assembly for use in a camera to seal a gap between a pair of movable lens frames, which assembly comprises:

a base for attachment to one of the lens frames; and a pair of fins extending from the base such that at least one of the fins is at a diverging angle with respect to the other fin, at least the one fin being deformable such that when the base is attached to said one lens frame, at least the one fin is deformed toward the other fin so that both fins are oriented in the same direction.

16. A sealing assembly according to claim 15, wherein each fin is shaped so that the fin gradually grows thinner from said base toward a distal end of the fin.

17. A sealing assembly according to claim 15, wherein the fins are annular fins each having a conical shape.

18. A sealing assembly according to claim 17, wherein the fins are composed of an elastic, flexible, rubber material.

* * * * *